US012328009B2

(12) United States Patent
Tchuintchui de Mbobda

(10) Patent No.: US 12,328,009 B2
(45) Date of Patent: Jun. 10, 2025

(54) PORTABLE CHARGING ASSEMBLY

(71) Applicant: Blondon Carlex Tchuintchui de Mbobda, North York (CA)

(72) Inventor: Blondon Carlex Tchuintchui de Mbobda, North York (CA)

(73) Assignee: Blondon Carlex Tchuintchui de Mbobda, North York (CA)

( * ) Notice: Subject to any disclaimer, the term of this patent is extended or adjusted under 35 U.S.C. 154(b) by 584 days.

(21) Appl. No.: 17/871,221

(22) Filed: Jul. 22, 2022

(65) Prior Publication Data

US 2024/0030745 A1 Jan. 25, 2024

(51) Int. Cl.
*H02J 50/10* (2016.01)
*H02J 50/00* (2016.01)

(52) U.S. Cl.
CPC ............ *H02J 50/10* (2016.02); *H02J 50/005* (2020.01)

(58) Field of Classification Search
USPC .......................... 320/106, 107, 108, 109, 110
See application file for complete search history.

(56) References Cited

U.S. PATENT DOCUMENTS

| | | | |
|---|---|---|---|
| D659,094 S | 5/2012 | Brand et al. | |
| 8,454,392 B2 | 6/2013 | Sulem et al. | |
| 9,812,892 B2 | 11/2017 | Miller et al. | |
| 9,893,543 B2 | 2/2018 | Miller et al. | |
| 11,133,697 B1 | 9/2021 | Ajayi | |
| D936,572 S | 11/2021 | Turksu et al. | |
| 2007/0285053 A1 | 12/2007 | Noguchi et al. | |
| 2009/0128090 A1 | 5/2009 | Bi | |
| 2012/0169272 A1 | 7/2012 | Khalepari | |
| 2014/0210405 A1 | 7/2014 | Yang | |
| 2019/0067952 A1* | 2/2019 | Kirchoff | ................. A24F 40/90 |
| 2020/0313446 A1* | 10/2020 | Park | ...................... H01M 10/46 |
| 2022/0158489 A1 | 5/2022 | Wilkinson | |

OTHER PUBLICATIONS

Kaseme Wireless Chargers, https://kasemedesign.ca/collections/wireless-charger?utm_source=google&utm_medium=paid&utm_campa, printed on Jul. 8, 2022.

(Continued)

*Primary Examiner* — Brian Ngo
(74) *Attorney, Agent, or Firm* — Argus Intellectual Enterprise, LLC; Jordan Sworen; Daniel Enea

(57) ABSTRACT

A portable charging assembly comprising a charging case and a portable charger is disclosed. The portable charger has a small size and can be connected to a port of a portable electronic device to recharge it. Advantageously, a charging case with a larger battery is provided for holding and recharging the portable charger, either when not needed or when battery of the portable charger is empty. The larger battery of the charging case ensures that the portable charger, when docked or engaged therein, is fully charged when required. The charging case itself can be connected via a charging cable to a power source to recharge it. When a portable electronic device needs to be recharged, the user can open the charging case, remove the portable charger, and plug it into their mobile device to continue with their activities seamlessly.

8 Claims, 6 Drawing Sheets

(56) References Cited

OTHER PUBLICATIONS

Wireless Phone Charger (https://phoneloops.com/products/wireless-phone-charger?variant=32110604124271&currency=USD&gclid=), printed on Jul. 8, 2022.

Magnetic Wireless Portable Charger, 10000mAh Wireless Power Bank AOGUERBE PD 22.5W Fast Charging with USB-C LED Display Mag-Safe Battery Pack Compatible for iPhone 12&13/Pro/Mini/Pro Max (Black) (https://www.amazon.ca/Magnetic-Wireless-Portable-AOGUERBE-Compatible/dp/B09MTDSJ1B/ref=sr_1_11?), printed on Jul. 8, 2022.

WALK Mini Power Bank 4500mAh, Portable Phone Charger with Built-in Plug Compact External Battery Pack Compatible with iPhone 13/13 Pro Max/12/12 Mini/12 Pro Max/11 Pro/XS Max/XR/X/8/7/6/6S (White) (https://www.amazon.ca/dp/B07Y9S972N/ref=sspa_dk_detail_3?psc=1&pf_rd_p=1986fb7c-bf95-4573-9455-3), printed on Jul. 8, 2022.

\* cited by examiner

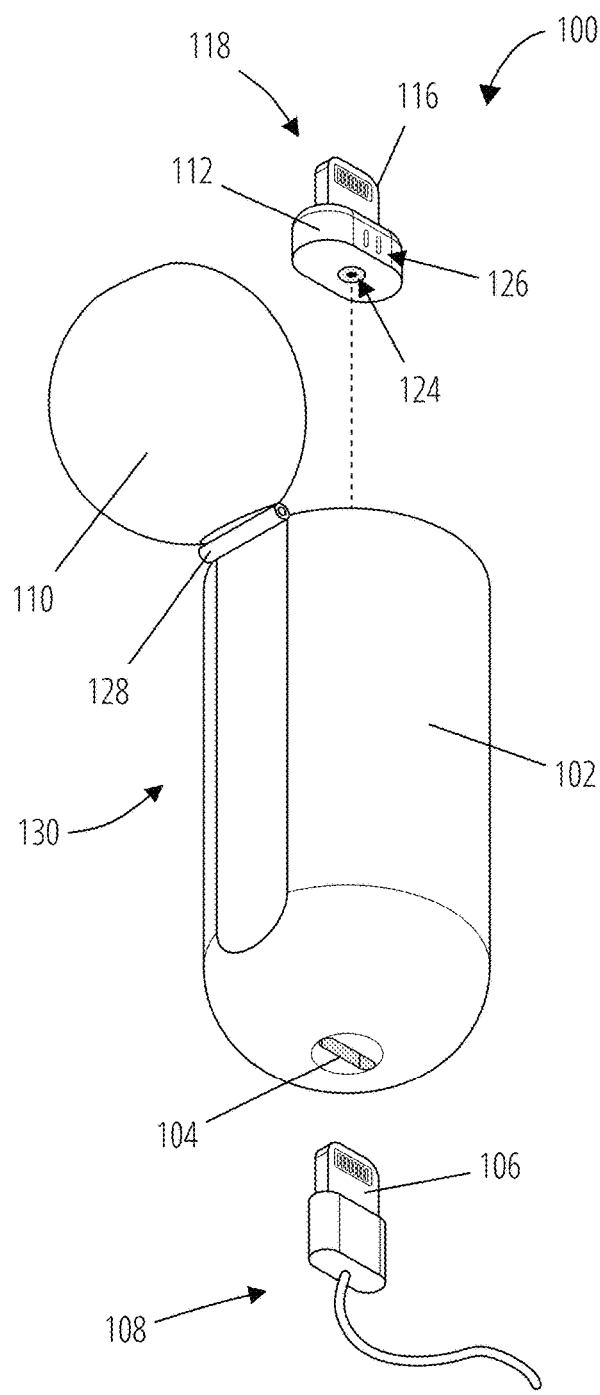
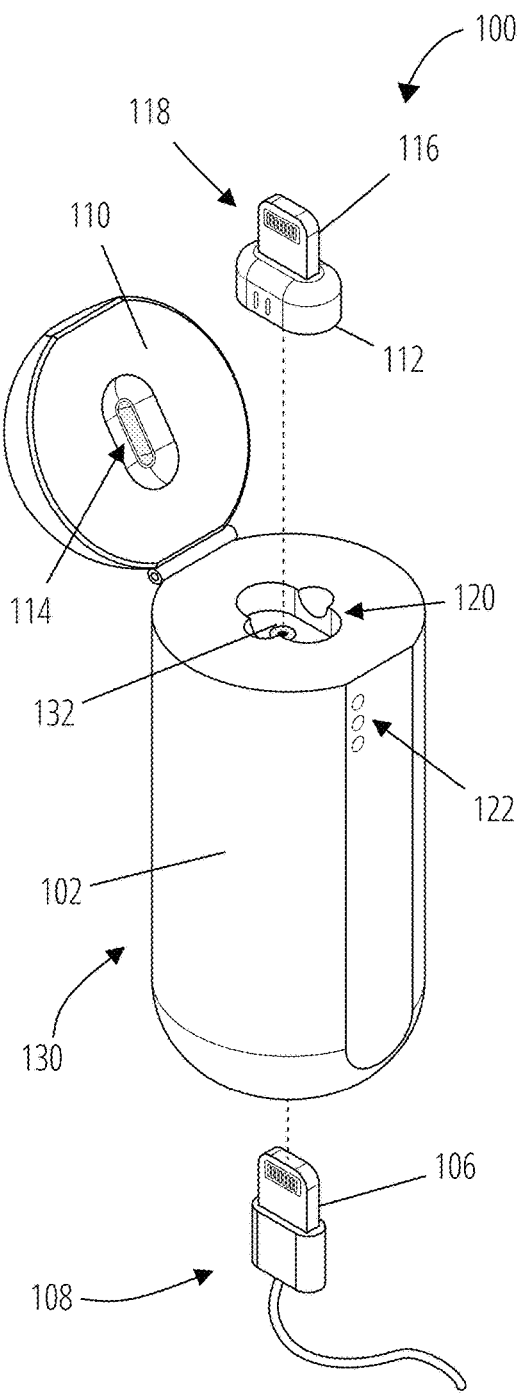
FIG. 1A  FIG. 1B

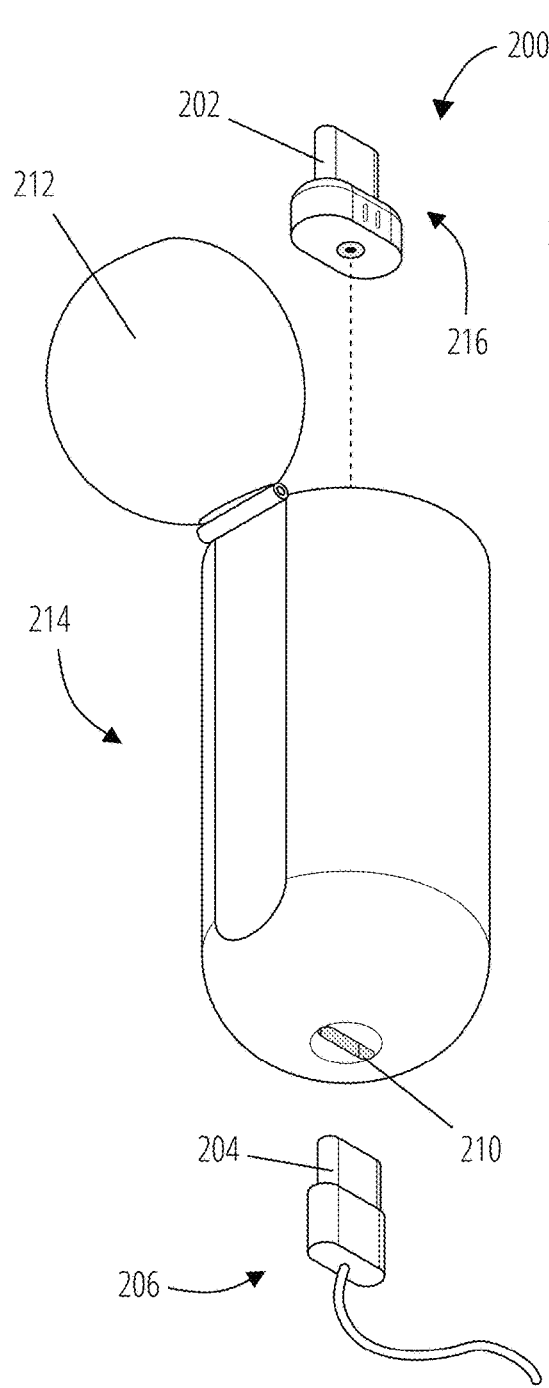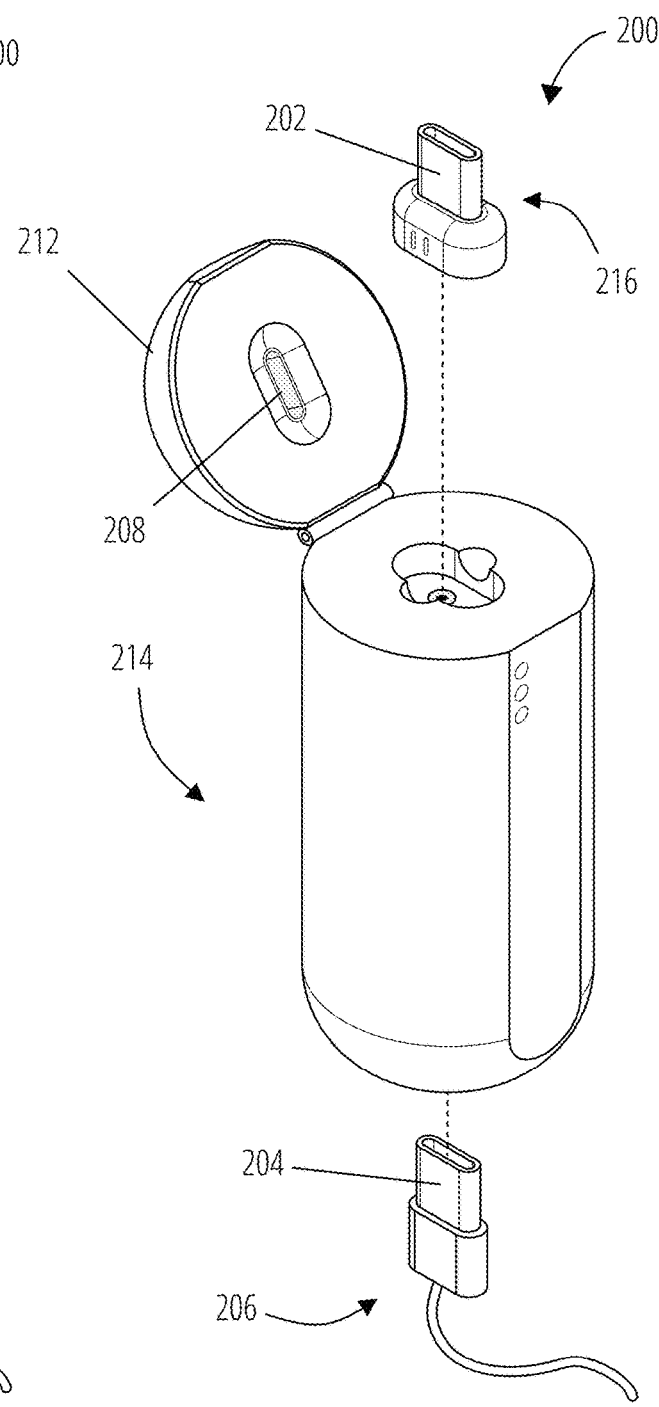
FIG. 2A　　　　　FIG. 2B

PORTABLE CHARGING ASSEMBLY

FIELD OF THE DISCLOSURE

The present disclosure relates to power chargers for electronic devices, and, in particular, to a portable charging assembly.

BACKGROUND

Various portable electronic devices used every day typically require charging more than once a day. While several types of charging means exist, for example charging cables, portable batteries, and wireless induction-based chargers, these often restrain how much the device can be used during recharging. Thus, it would be advantageous to be able to recharge a portable electronic device while moving around, even using the device, without having access to a power outlet or another source of electrical power.

U.S. Pat. No. 8,454,392 B2 (Sulem et al.) discloses a system and method for coupling a portable electronic device to a charging/data pod. In one example, an adaptor is provided. The adaptor comprises a first portion including a plug insertable into a port of a portable electronic device. The adaptor further comprises a second portion including at least one adaptor contact configured such that, when the plug of the first portion is inserted into the port and the portable electronic device is placed in a pod, the at least one adaptor contact abuts to at least one pod contact in the pod.

U.S. Pat. No. 11,133,697 B2 (Ajayi) discloses a wireless portable electronic charger. In one example, the wireless portable electronic charger recharges each of the one or more personal data devices. The wireless portable electronic charger: a) draws AC electrical energy from a national electric grid; and, b) wirelessly broadcasts the received AC electrical energy to the one or more personal data devices. The wireless portable electronic charger comprises an energy broadcast circuit and one or more induction circuits. The energy broadcast circuit broadcasts the received AC electrical energy to the one or more induction circuits. Each induction circuit selected from the one or more induction circuits: a) receives the AC electrical energy broadcast from the energy broadcast circuit; b) converts the received AC electrical energy into DC electrical energy suitable for use by a personal data device associated with the selected induction circuit; and, c) transmits the DC electrical energy to the battery of the personal data device.

U.S. Pat. No. 9,893,543 B2 (Miller et al.) discloses a portable power charger. In one example, the portable charger is provided for charging one or more electronic devices simultaneously from a rechargeable internal battery. To accommodate multiple electronic devices, a portable charger unit is combined with multiple connectors for connecting to more than one electronic device, as necessary. For example, the charger unit includes two or more connector cables removably attached to the charger unit and stored within the charger housing for connection to electronic devices when needed. An adapter unit is provided for connection to the charger unit for recharging the internal battery of the charger unit.

U. S. Pat. App. Pub. No. 2009/0128090 A1 (Bi) discloses a portable charger for consumer electronic devices. In one example, the portable charger is configured to be used with mobile phones and other consumer electronic devices like iPOD, MP3 players, etc. The portable charger is a plug-and-charge device, it includes both male and female connectors, built-in rechargeable Li-Polymer or Li-Ion battery, LED and ON/OFF button. USB-flash-drive like design with cap covering male connector, lightweight enough to be attached to a key chain, when is needed, it can be plugged into Cell phone or other portable devices to charge devices right away. In various embodiments, different functionalities are added: utility light, MP3 player, FM radio transmitter, FM radio receiver, Bluetooth audio adapter, voice recorder, USB flash drive.

U. S. Pat. App. Pub. No. 2022/0158489 (A1) discloses a portable wireless charger with wireless charging base. In one example, a portable charger for an electronic device is disclosed, including a wireless charging base configured to store supplemental power and transmit the supplemental power to a portable wireless charger. The portable wireless charger is in electrical communication with the wireless charging base. The portable wireless charger is configured to wirelessly transmit the stored supplemental power wirelessly to an electronic device. The portable wireless charger is releasably engaged to the wireless charging base.

U.S. Pat. No. 9,812,892 B2 (Miller et al.) discloses a portable power charger with wireless and direct charging connectivity. In one example, the portable power charger unit is provided for charging one or more electronic devices. The portable charger unit includes a charger housing storing a rechargeable battery, and wireless power transmission components, such as a transmitter and a receiver for recharging the charger as well as electronic devices via wireless power transmission methods. The portable charger unit also includes at least one power connection for connecting the charger with an external power source, or at least one electronic device, or both, for direct charge connectivity. The power connection can be a power connection port or a power connector cable, attached to the charger housing, each of them capable of acting as a power input, a power output, or both. A processing unit controls operation of the portable charger unit for wireless and direct charging.

U.S. Pat. App. Pub. No. 2014/0210405 A1 (YANG) discloses a portable wireless charger. In one example, the secondary batteries of the nickel-hydrogen batteries and nickel-cadmium batteries have the parallel-connected separated detection charging mode and series-connected combined discharging mode to achieve highest efficiency of power release. The charger also provides a DC TO AC output control unit coupled with the power storing unit and converting a discharging current into an output power with a predetermined voltage level and a wireless power transmitter having stable high efficiency of the output power. A slim portable wireless charging platform is also provided for charging mobile devices with built-in wireless inductive receiver without electrical contacts to enhance ease of use and safety effect.

U.S. Pat. App. Pub. No. 2012/0169272 A1 (Khalepari) discloses a portable USB mini-charger device. In one example, the portable USB mini-charger device is configured to easily connect portable electronic devices to readily available power sources to operate or recharge internal rechargeable batteries. The present invention is further comprised of components to increase the number of easily accessible electrical connections to allow a greater number of portable electronic devices to be powered by a USB connection. The present invention provides adaptability to connect to either a DC or AC current power source further increasing the number of readily available power sources to maintain the portability and mobility characteristics inherent in portable electronic devices.

U.S. Pat. App. Pub. No. 2007/0285053 A1 (Noguchi et al.) discloses a portable charger. In one example, the portable charger storage device is configured for powering electronic devices especially those configured for receiving power from a 9 volt DC adapter source and configured to generate its own power through a fully self-contained, manually operable power generator. A switch-controlled flashlight utilizing a LED is also provided. The internal rechargeable battery may be recharged through either the power generator or DC power source coupled to the device through respective input connectors. Indicators provide the charging status of the power backup source. The flashlight, in another embodiment, is configured to be turned on responsive to a motion sensor as well as being configured to turn on under control of an ambient light sensor. Audio and visual alarms may also be utilized. An SOS mode is provided to generate an SOS alarm which is set to operate over a given time interval.

However, none of the above-mentioned references disclose a portable charger and a charging case, both the portable charger and the charging case having their own internal battery, the charging case configured to house therein and recharge the portable charger, the portable charger removable from said charging case and pluggable into a portable electronic device.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a portable charging assembly comprising a portable charger and a charging case for charging portable electronic devices, both the portable charger and the charging case having their own internal battery, the charging case configured to house therein and recharge the portable charger, the portable charger removable from said charging case and pluggable into a portable electronic device.

In accordance with a first aspect, there is provided a portable charging assembly for charging a portable electronic device, the portable electronic device comprising at least one port configured to receive, at least in part, electrical power therefrom to charge an internal battery of said portable electronic device; the portable charging assembly comprising: a portable charger comprising: a connector configured to removably engage said port of said portable electronic device; a first body coupled to said connector, the first body comprising: a first rechargeable battery for storing a first amount of electrical power; a first set of conductive contacts oppositely located from said connector; and a first charging circuit operatively coupled to said first battery, said connector and said first set of conductive contacts, and configured to charge said first battery via said first set of conductive contacts, and further being configured to transfer electrical power from the first battery to the portable electronic device upon the connector being engaged with the at least one port thereof, thereby charging the portable electronic device; a portable charging case comprising: a second body, the second body comprising: a second rechargeable battery for storing a second amount of electrical power, the second amount of electrical power being larger than the first amount of electrical power; a charging port configured to receive therein an input connector of a charging cable coupled to an electrical power source; a first recess on a side of said body, the first recess shaped to receive therein, at least in part, said portable charger so that said first set of conductive contacts of said portable charger are physically in contact with a second set of conductive contacts at the bottom of said recess, thereby forming an electrical coupling therebetween; a second charging circuit operatively coupled to said second battery, said charging port and said second set of conductive contacts, and configured to charge the second battery upon the input connector being received by said charging port, and being further configured to charge said portable charger by providing electrical power from said second battery to said second set of conductive contacts upon the first set of conductive contacts being electrically coupled with said second set of conductive contacts; and a cover pivotally coupled to said body and configured to, in a closed configuration, cover and secure said portable charger in said first recess to maintain said electrical coupling between said first set of conductive contacts and said second set of conductive contacts.

In one embodiment, the connector and input connector are both an Apple Lightning™ connector, and wherein said charging port is an Apple Lightning™ port.

In one embodiment, the connector and input connector are both a USB-C connector, and wherein said charging port is a USB-C port.

In one embodiment, the first set of conductive contacts and the second set of conductive contacts have a circular symmetry.

In one embodiment, the portable charger further comprises a first set of indicator lights on said first body coupled to said first charging circuit and operable to indicate a charge status of said first battery.

In one embodiment, the charging case further comprises a set of second set of indicator lights on said second body coupled to said second charging circuit and operable to indicate a charge status of said second battery.

In one embodiment, the body of said charging case is cylindrical body.

In one embodiment, the first recess is shaped to receive therein a lower portion of said portable charger comprising said first set of conductive contacts, and wherein said cover further comprises a second recess shaped to receive therein, in the closed configuration, an upper portion of said portable charger comprising, at least in part, said connector of the portable charger.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein:

FIG. 1A and FIG. 1B are perspective drawings illustrating a portable charging assembly comprising a portable charger and a charging case, in accordance with one embodiment;

FIG. 2A and FIG. 2B are perspective drawings illustrating a portable charging assembly comprising a portable charger and a charging case, in accordance with another embodiment;

Figure 3:
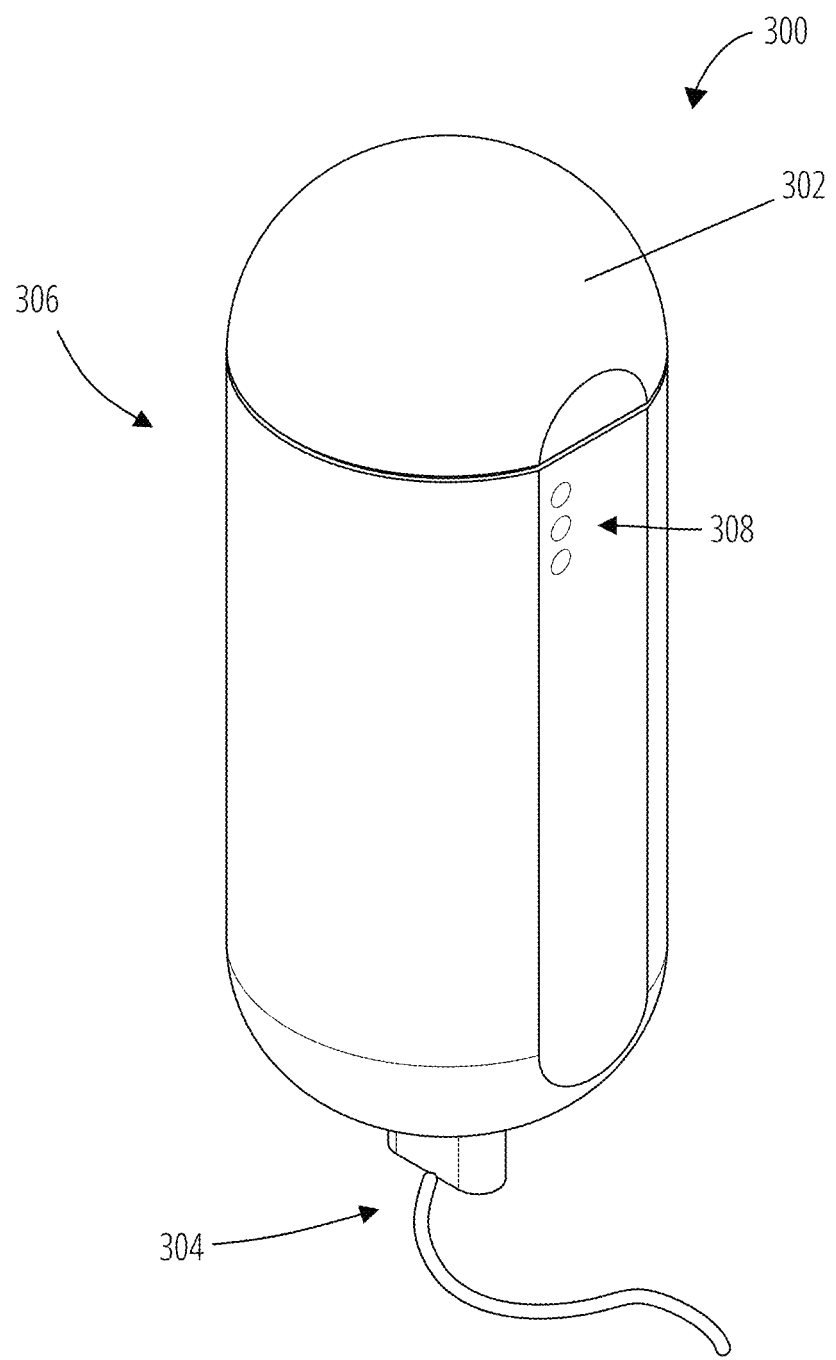
FIG. 3 is a perspective drawing illustrating a charging case of the portable charging assembly connected to a charging cable, in accordance with one embodiment.

Elements in the several drawings are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

In accordance with different embodiments, a portable charging assembly comprising a charging case and a portable charger is disclosed. The portable charger has a small size and can be connected to a port of the electronic device to recharge it. Because of its small size, the user can move around and use the electronic device with the charger still connected to it without being encumbered. In addition, the charger is small enough so that the device may be stored as usual. For example, a smart phone having the portable charger connected to it can be easily slid into a pocket or the like. Thus, the portable electronic device is not tethered via a charging cable nor is it required to stay in close proximity to a stationary charger at a given location as is the case with most inductive chargers. Advantageously, a charging case with a larger battery is provided for holding and recharging the portable charger, either when not needed or when battery of the portable charger is empty. The larger battery of the charging case ensures that the portable charger, when docked or engaged therein, is fully charged when required. The charging case itself can be connected via a charging cable to a power source to recharge it. When a portable electronic device needs to be recharged, the user can open the charging case, remove the portable charger, and plug it into their mobile device to continue with their activities seamlessly.

FIG. 1A and FIG. 1B are perspective drawings of portable charging assembly 100, in accordance with one embodiment. In this example, the portable charging assembly 100 comprises a portable charger 118 and a charging case 130. The portable charger 118 comprises a body 112, which is typically small in size, for example the size of a USB key or smaller. Coupled to the body 112 is a connector 116 (in this example an Apple Lightning™ connector) on one end, and a set of conductive contacts 124 on the other. In some embodiments, charging status indicator lights 126 may be located on the body 112. In the illustrated exemplary embodiment, two indicator lights are provided: one for indicating that the battery of the portable charger 118 is low, while the other may be used to indicate that the battery is full. In some embodiments, different colors may be used, for example red for the low battery indicator light while blue may be used for the battery full indicator light.

The charging case 130 comprises a body 102, herein shown to be advantageously cylindrical in shape so to be more easily held while being manipulated, and a cover 110 hingedly coupled thereto via a hinge 128. A top portion of the body 102 comprises a recess 120 therein shaped and configured to receive therein a lower portion of the body 112 of the portable charger 118. In addition, the bottom of the recess 120 comprises another set of conductive contacts 132 configured to be in physical contact with the set of conductive contacts 124 of the portable charger 118 upon the charger being engaged therein so as to provide an electrical connection between the portable charger 118 and the charging case 130. This allows the portable charger 118 to be recharged when docked or engaged inside the recess 120 of the charging case 130. In addition, the cover 110 also comprises therein a recess 114 shaped to securely receive therein an upper portion of the portable charger 118, including the connector 116. Thus, the cover 110 is configured to firmly hold and secure the portable charger 118 inside the charging case 130 upon being closed to maintain a constant physical contact between the conductive contacts 132 and 124, even when the charging case 130 is being moved or manipulated.

The body 102 of the charging case 130 further comprises, at an opposite end of the cover 110, a charging port 104 configured to receive therein a connector 106 (herein an Apple Lightning™ connector) of a charging cable 108 for charging the charging case 130. In addition, the body 102 of the charging case 130 also comprises thereon a plurality of indicator lights 122. In the illustrated embodiment, three indicator lights are provided, as an example. On light may be used to indicate a full battery, the second light may be used to indicate charging while the third light may be used to indicate a low battery. However, other configurations from the one illustrated herein for the indicator lights 122 may also be used.

FIG. 2A and FIG. 2B are perspective drawings of a portable charging assembly 200, in accordance with another embodiment. This example is similar to the one shown in FIGS. 1A and 1B, but with the connectors 202 and 204 being USB-C connectors instead of Apple Lightning™ connectors. Correspondingly, the recess 208 of the cover 212 is shaped to receive such a USB-C connector therein, while the charging port 210 at the bottom of the portable charger 214 is also a USB-C port so as to receive the USB-C connector 204 of the charging cable 206.

FIG. 3 is a perspective drawing illustrating a portable charging assembly 300, in accordance with one embodiment, wherein a portable charger (not shown) is securely housed inside the charging case 130 with the cover 302 closed, and with the charging case 130 being connected to a charging cable 304 so as to recharge the charging case 306, and if necessary the portable charger. Also shown are the three indicator lights 308 used to indicate a charging status of the charging case 304 (e.g., fully charged, charging or low charge).

Figure 4A:
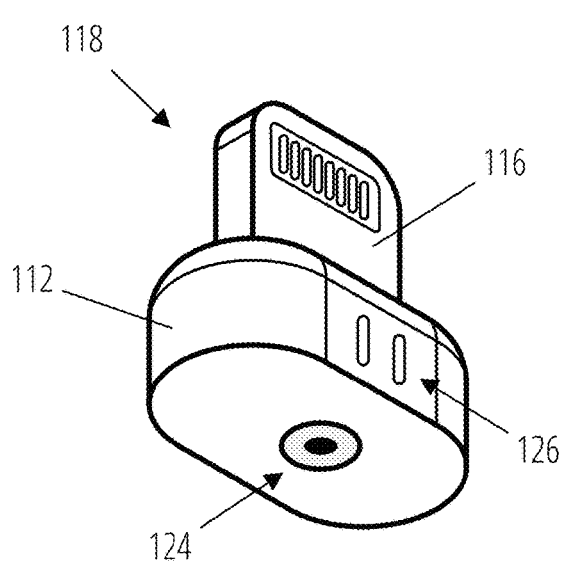
FIG. 4A and FIG. 4B are perspective drawings illustrating the portable charger of FIGS. 1A and 1B, in accordance with one embodiment.
Figure 4B:
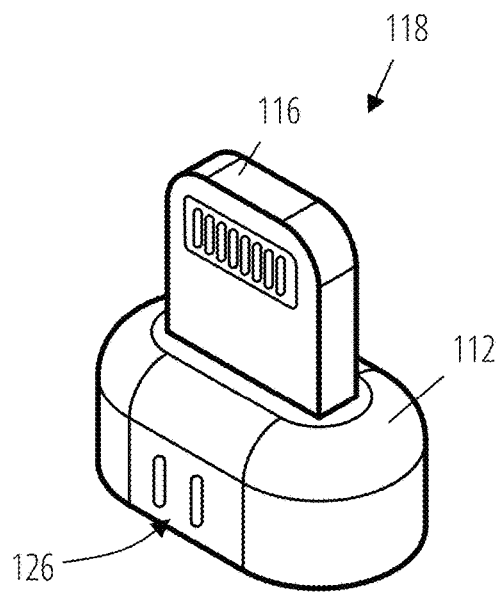

FIG. 4A and FIG. 4B are perspective drawings illustrating a close-up of the portable charger 118 of FIGS. 1A and 1B. Shown is the Apple Lightning™ connector 116 coupled to the charger body 112, which comprises the two charging status indicator lights 126, and a set of conductive contacts 124.

Figure 5A:
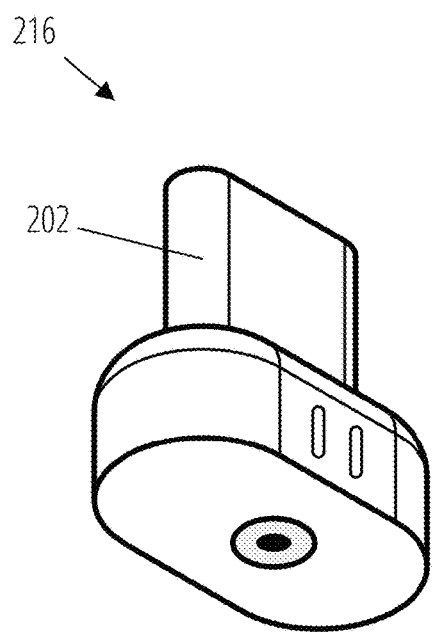
FIG. 5A and FIG. 5B are perspective drawings illustrating the portable charger of FIGS. 2A and 2B, in accordance with one embodiment.
Figure 5B:
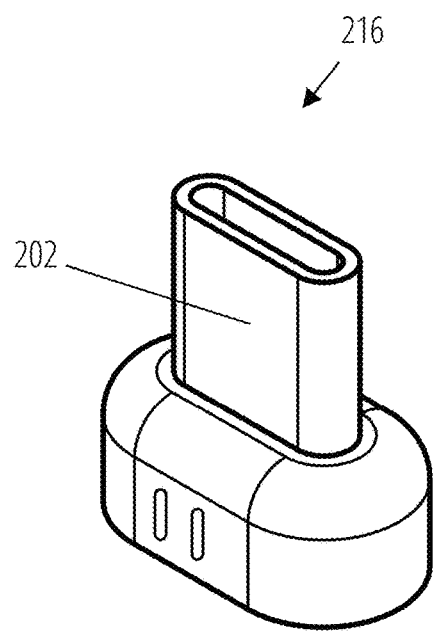

Similarly, FIG. 5A and FIG. 5B are perspective drawings illustrating a close-up of the portable chargers 216 of FIGS. 2A and 2B, showing for example the USB-C connector 202.

Figure 6A:
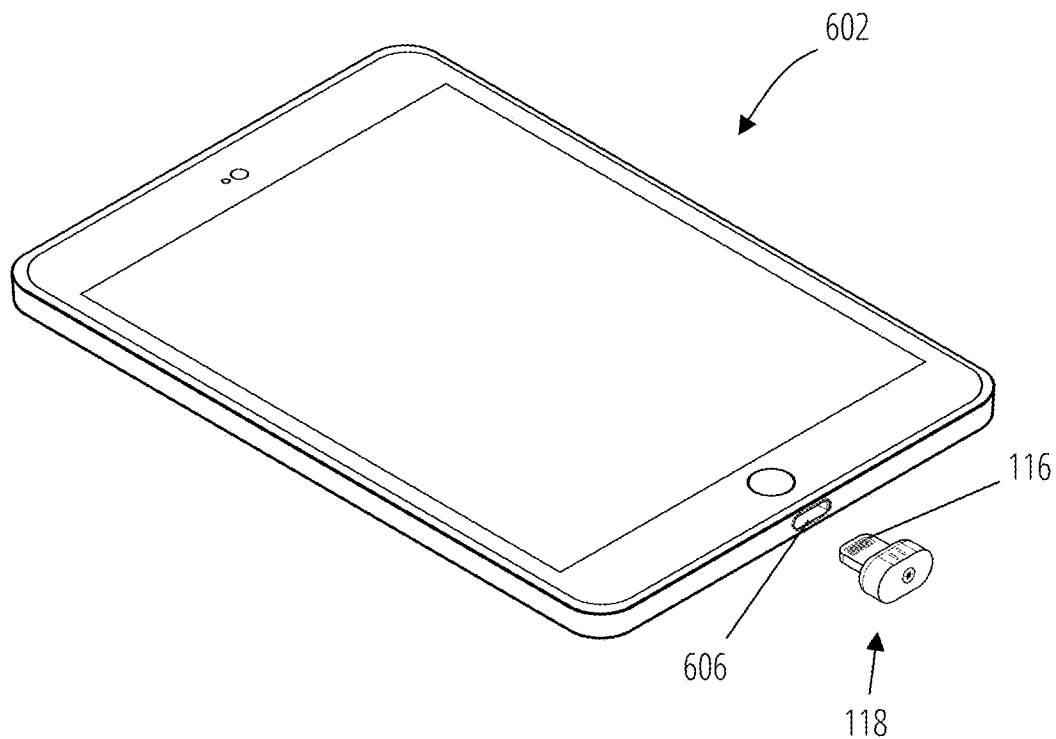
FIG. 6A and FIG. 6B are perspective drawings illustrating the portable chargers of FIGS. 1A-B and 2A-B, respectively, with a portable electronic device, in accordance with different embodiments.
Figure 6B:
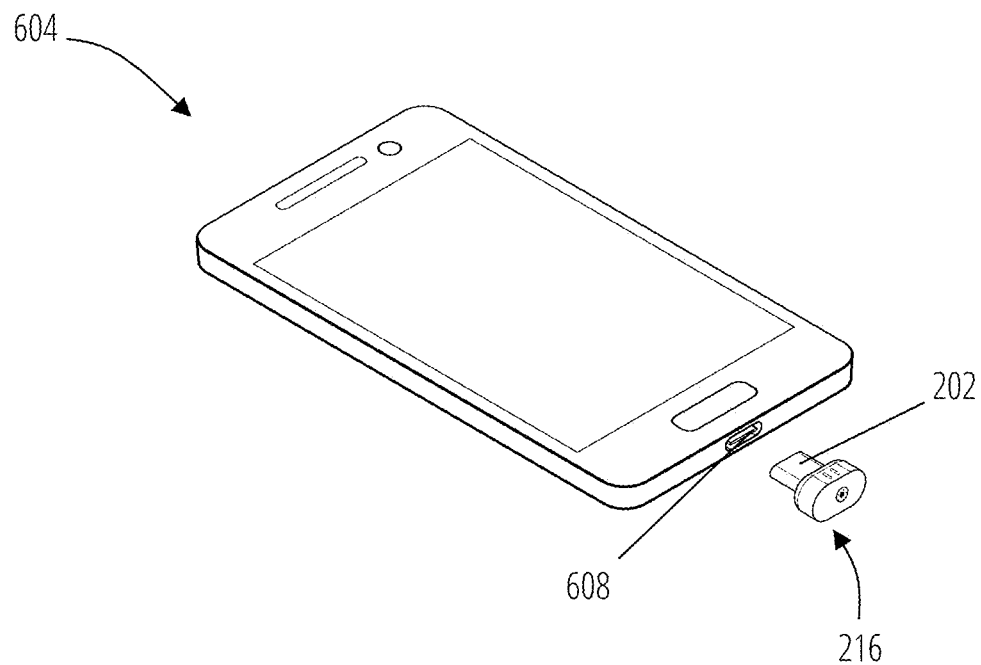

FIG. 6A and FIG. 6B are perspective drawings illustrating, as examples only, the portable connectors and exemplary portable electronic devices. FIG. 6A shows a tablet 602 (e.g., an Apple iPad™) having an Apple Lightning™ port 606 configured to receive the Apple Lightning™ connector 116 of the portable charger 118 therein. Similarly, FIG. 6B shows a smart phone 604 having a USB-C port 608 configured to receive the USB-C connector 202 of the portable charger 216 therein. The portable electronic device that may be recharged by the portable chargers include any type of consumer electronic device comprising a port which may be used, at least in part, to recharge an internal battery of said device. Examples include, without limitation, a smartphone, a tablet computing device, a PDA, a smart watch, a laptop computer, a video game console or other portable computing/communications device.

The skilled person in the art will appreciate that the relative sizes and shapes of the different components of the portable charging assembly may differ, in some embodiments, from the ones illustrated in FIGS. 1A, 1B, 2A, 2B and 3 and that these are provided as an example only. In addition, some embodiments may provide different types of connectors than the ones illustrated herein, without limitation.

In addition, different numbers of light indicators may be used, either for the portable charger or for the charging case. Different colors may be associated with each light of the indicator lights. Charge status may also be indicated using blinking lights or the like. In some embodiments, the indicator lights comprise light emitting diodes (LEDs) or the like.

While FIGS. 1A-B, 2A-B, 4B and 5B have shown the conductive contacts of the portable charger (e.g., conductive contacts 124 and 132 for example) as having a first circular conductive contact and a second circumferentially located conductive contact, the skilled person in the art will appreciate that other designs may be used as well, including having each contact side by side, for example.

Figure 7:
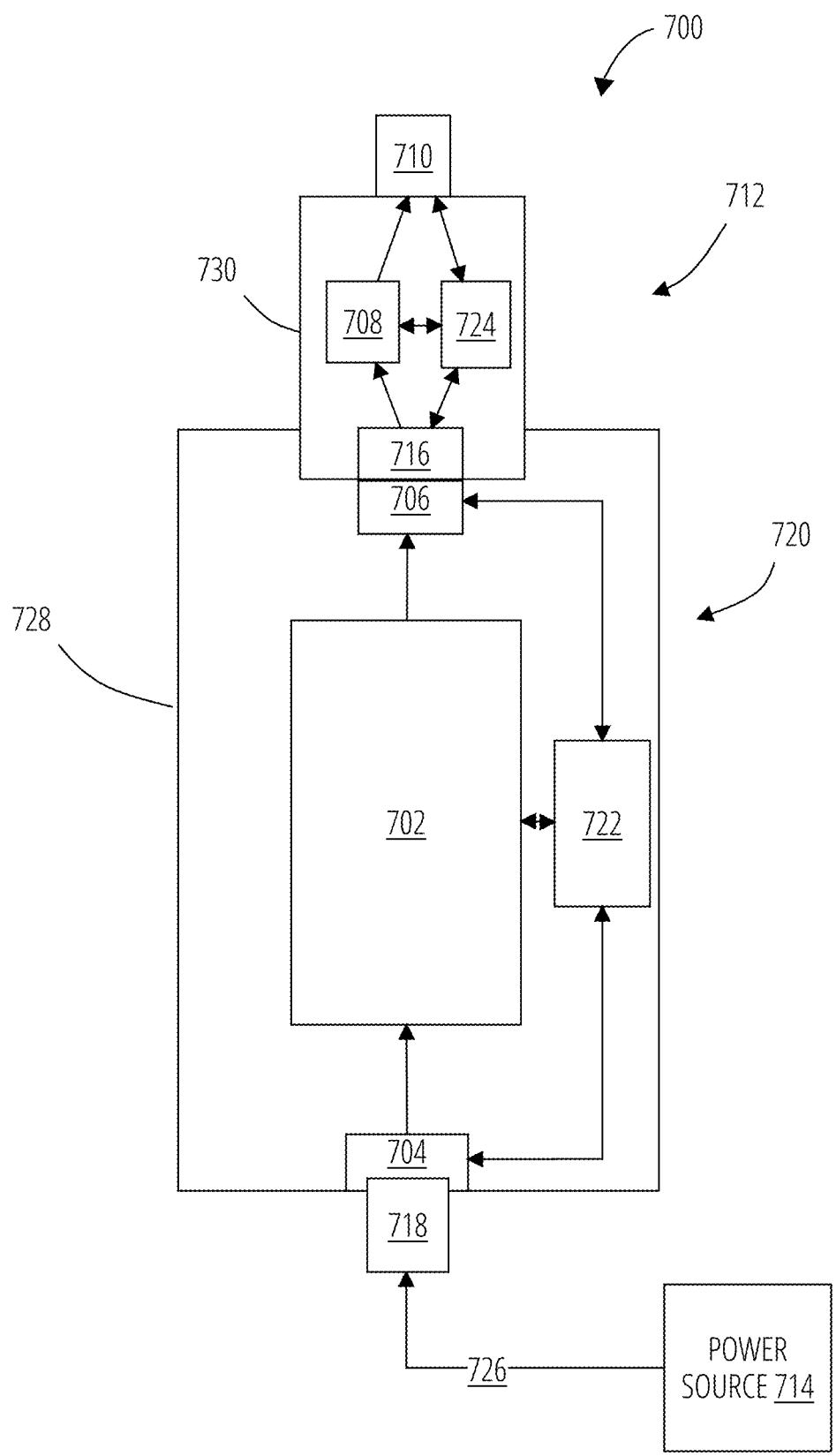
FIG. 7 is a box diagram illustrating the internal components of the charging assembly, in accordance with one embodiment.

FIG. 7 is a block diagram illustrating schematically the interior components of a charging assembly 700, in accordance with one embodiment.

In this example, the charging assembly 700 is shown comprising a portable charger 712 electrically coupled to a charging case 720. The portable charger 712 comprises inside a body 730 thereof a rechargeable battery 708 and a set of conductive contacts 716. Also coupled to the body 730 is a connector 710 operable to engage a port of a portable electronic device. A charging circuit 724 operatively coupled to the battery 708, the connector 710 and the conductive contacts 716 is also provided. The charging circuit 724 is configured, at least in part, to charge of the battery 708 upon electrical power being received via the set of conductive contacts 716, while discharging the battery through the connector 710 upon the connector 710 being engaged with a port of an electronic device (not shown).

The portable charger 720 is shown to comprise inside a body 728 thereof a battery 702, which is typically larger in capacity than the capacity of the battery 708 of the portable charger 712. The capacity of the battery 702 should be at least equal to the capacity of the battery 708 of the portable charger. However, having a larger capacity ensures that the portable charger 118 is more easily kept fully charged, and reduces the number of times the portable charger 720 needs to be recharged. Also shown are a set of conductive contacts 706, herein shown to be in physical contact with the corresponding set of conductive contacts 716 of the portable charger 712, thereby forming an electrical coupling therebetween, and a charging port 704 configured to receive therein a connector 718 of a charging cable 726 electrically coupled to a power source 714 (e.g., a power outlet, a port of another device configured to provide electrical power, etc.). The charging case 720 further comprises a charging circuit 722 operatively coupled to the battery 702, the conductive contacts 706 and the charging port 704, and configured, at least in part, to recharge the battery 702 upon the charging port 704 being engaged by the connector 718 of the charging cable 726, and to transfer electrical power from said battery 702 to the portable charger 712 via the set of conductive contacts 706.

In some embodiments, the charging circuits 724 and 722 may also be configured to monitor the status of the batteries 708 and 702, respectively, and to each be coupled a plurality of indicator lights (not shown) so as to indicate a charge status. In addition, the charging circuits 724 and 722 may comprise one or more processors operatively coupled to a memory, storage and one or more input/output and/or communication modules.

Furthermore, the skilled person in the art will appreciate that different types of rechargeable batteries for the batteries 708 and 702 may be used, without limitation. This may include, for example, lithium-ion ("Li-ion") batteries or the like. In some embodiments, the batteries 708 and 702 may use distinct battery technologies.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Information as herein shown and described in detail is fully capable of attaining the above-described object of the present disclosure, the presently preferred embodiment of the present disclosure, and is, thus, representative of the subject matter which is broadly contemplated by the present disclosure.

What is claimed is:

1. A portable charging assembly for charging a portable electronic device, the portable electronic device comprising at least one port configured to receive, at least in part, electrical power therefrom to charge an internal battery of said portable electronic device; the portable charging assembly comprising:

a portable charger comprising:
- a connector configured to removably engage said port of said portable electronic device;
- a first body coupled to said connector, the first body comprising:
  - a first rechargeable battery for storing a first amount of electrical power;
  - a first set of conductive contacts oppositely located from said connector; and
  - a first charging circuit operatively coupled to said first battery, said connector and said first set of conductive contacts, and configured to charge said first battery via said first set of conductive contacts, and further being configured to transfer electrical power from the first battery to the portable electronic device upon the connector being engaged with the at least one port thereof, thereby charging the portable electronic device;

a portable charging case comprising:
- a second body, the second body comprising:
  - a second rechargeable battery for storing a second amount of electrical power, the second amount of electrical power being larger than the first amount of electrical power;
  - a charging port configured to receive therein an input connector of a charging cable coupled to an electrical power source;
  - a first recess on a side of said body, the first recess shaped to receive therein, at least in part, said portable charger so that said first set of conductive contacts of said portable charger are physically in contact with a second set of conductive contacts at the bottom of said recess, thereby forming an electrical coupling therebetween;
  - a second charging circuit operatively coupled to said second battery, said charging port and said second set of conductive contacts, and configured to charge the second battery upon the input connector being received by said charging port, and being further configured to charge said portable charger by providing electrical power from said second battery to said second set of conductive contacts upon the first set of conductive contacts being electrically coupled with said second set of conductive contacts; and
  - a cover pivotally coupled to said body and configured to, in a closed configuration, cover and secure said portable charger in said first recess to maintain said electrical coupling between said first set of conductive contacts and said second set of conductive contacts.

2. The portable charging assembly of claim 1, wherein the connector and input connector are both an Apple Lightning™ connector, and wherein said charging port is an Apple Lightning™ port.

3. The portable charging assembly of claim 1, wherein the connector and input connector are both a USB-C connector, and wherein said charging port is a USB-C port.

4. The portable charging assembly of claim 1, wherein said first set of conductive contacts and said second set of conductive contacts have a circular symmetry.

5. The portable charging assembly of claim 1, wherein said portable charger further comprises a first set of indicator lights on said first body coupled to said first charging circuit and operable to indicate a charge status of said first battery.

6. The portable charging assembly of claim 1, wherein said charging case further comprises a set of second set of indicator lights on said second body coupled to said second charging circuit and operable to indicate a charge status of said second battery.

7. The portable charging assembly of claim 1, wherein said body of said charging case is cylindrical body.

8. The portable charging assembly of claim 1, wherein said first recess is shaped to receive a lower portion of said portable charger comprising said first set of conductive contacts, and wherein said cover further comprises a second recess shaped to receive therein, in the closed configuration, an upper portion of said portable charger comprising, at least in part, said connector of the portable charger.

* * * * *